United States Patent
Sherk, Jr.

(10) Patent No.: US 9,271,515 B2
(45) Date of Patent: Mar. 1, 2016

(54) RAW BONE PRODUCT AND METHOD

(71) Applicant: MiracleCorp Products, Dayton, OH (US)

(72) Inventor: William M. Sherk, Jr., Dayton, OH (US)

(73) Assignee: MiracleCorp Products, Dayton, OH (US)

( * ) Notice: Subject to any disclaimer, the term of this patent is extended or adjusted under 35 U.S.C. 154(b) by 0 days.

(21) Appl. No.: 14/274,251

(22) Filed: May 9, 2014

(65) Prior Publication Data

US 2014/0248409 A1    Sep. 4, 2014

Related U.S. Application Data

(62) Division of application No. 13/589,526, filed on Aug. 20, 2012.

(60) Provisional application No. 61/537,242, filed on Sep. 21, 2011.

(51) Int. Cl.
| | |
|---|---|
| A23K 1/00 | (2006.01) |
| A23K 1/10 | (2006.01) |
| A23K 1/18 | (2006.01) |

(52) U.S. Cl.
CPC .............. *A23K 1/002* (2013.01); *A23K 1/003* (2013.01); *A23K 1/106* (2013.01); *A23K 1/1853* (2013.01)

(58) Field of Classification Search
CPC .................................. A23J 1/001; A23J 3/04
USPC ........................................................ 426/805
See application file for complete search history.

(56) References Cited

U.S. PATENT DOCUMENTS

| | | | | |
|---|---|---|---|---|
| 3,882,257 | A * | 5/1975 | Cagle | 426/274 |
| 4,302,665 | A * | 11/1981 | Hoenig | 377/45 |
| 2004/0045450 | A1* | 3/2004 | Hernando | 99/467 |
| 2009/0114602 | A1* | 5/2009 | Logan et al. | 210/744 |

* cited by examiner

*Primary Examiner* — Nikki H Dees
*Assistant Examiner* — Stephanie Cox
(74) *Attorney, Agent, or Firm* — Walters & Wasylyna LLC

(57) ABSTRACT

A raw bone product including ground raw bone compressed into a mass, wherein the ground raw bone has been subjected to a hydrostatic pressure of at least 4000 atm for a predetermined amount of time, and wherein the mass is maintained at a temperature of at most 40° F.

8 Claims, 5 Drawing Sheets

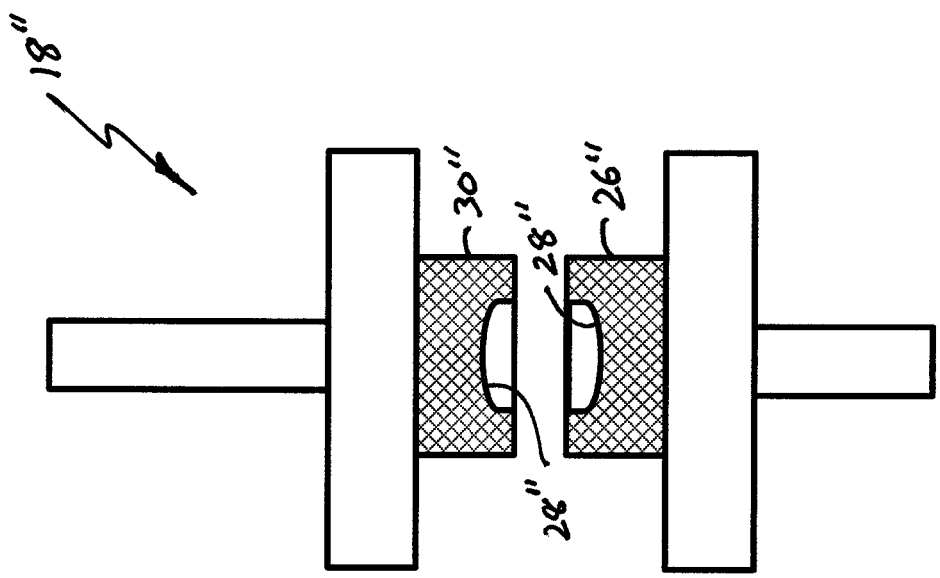

RAW BONE PRODUCT AND METHOD

PRIORITY

This application is a divisional of U.S. Ser. No. 13/589,526 filed on Aug. 20, 2012, which claims priority from U.S. Ser. No. 61/537,242 filed on Sep. 21, 2011. The entire contents of both priority applications are incorporated herein by reference.

FIELD

This application relates to consumable products for animals and, more particularly, to raw bone products that have been processed to aid in consumption and to prolong shelf life, thereby improving food safety.

BACKGROUND

Household pets, such dogs and cats, are commonly fed either dry food or wet food. Dry pet food, also known as kibble, typically includes a combination of ingredients, such as meat, vegetables and grains, and is sold in bulk in pelletized form. The low moisture content of dry pet food, typically below 10 percent by volume, ensures a relatively long shelf life, particularly when packaged in air-tight bags. Wet pet food, like dry pet food, typically includes a combination of ingredients, such as meat, vegetables and grains, but with a significantly higher moisture content (e.g., 60 percent or more). Therefore, to prolong shelf life, wet pet food is typically packaged in smaller containers (e.g., individual cans) and sterilized.

It has been observed that dogs and cats may benefit from diets that more closely resemble the diets of their evolutionary ancestors. Specifically, significant health benefits have been observed in dogs and cats that are fed a diet of raw meat, including raw bone, as well as in dogs and cats that are fed a traditional diet of dry or wet food that is supplemented with raw meat.

Unfortunately, feeding household pets raw food is more burdensome than feeding with traditional pet foods due to the relatively short shelf life of raw foods. Furthermore, concerns about bone splintering have kept many pets owners from incorporating raw meat into their pets' diets.

Accordingly, those skilled in the art continue with research and development efforts in the field of consumable products for animals.

SUMMARY

In one aspect, the disclosed raw bone product may include ground raw bone compressed into a mass, wherein the ground raw bone has been subjected to a hydrostatic pressure of at least 4000 atm for a predetermined amount of time, and wherein the mass is maintained at a temperature of at most 40° F.

In another aspect, disclosed is a method for manufacturing a raw bone product. The method may include the steps of (1) providing a raw bone; (2) grinding the raw bone; (3) compressing (e.g., in a press or extruder) the ground raw bone into a rigid mass; and (4) pasteurizing the ground raw bone at a temperature of at most 100° F. The pasteurizing step may be performed before and/or after the compressing step.

In yet another aspect, the disclosed method for manufacturing a raw bone product may include the steps of (1) providing a raw bone; (2) grinding the raw bone; (3) compressing the ground raw bone into a rigid mass; (4) pasteurizing the ground raw bone in a high pressure pasteurization vessel; and (5) cooling the pasteurized, compressed, ground raw bone to a refrigeration or frozen temperature. The pasteurizing step may be performed before and/or after the compressing step.

Other aspects of the disclosed raw bone product and method will become apparent from the following detailed description, the accompanying drawings and the appended claims.

BRIEF DESCRIPTION OF THE DRAWINGS

FIG. 2D is a side elevational view of an alternative press for performing the compression step of the method of FIG. 1;

DETAILED DESCRIPTION

Disclosed is a raw bone product. The raw bone product may include ground raw bone compressed into a generally rigid mass. The compressed mass of ground raw bone may be cold pasteurized, such as by using a high pressure pasteurization technique, thereby increasing shelf life while avoiding the partial cooking that results from traditional heat pasteurization. The resulting pasteurized, ground raw bone product may be cooled (if necessary) and maintained at either a refrigeration temperature or a frozen temperature until it is ready to be consumed.

The disclosed raw bone product may be suitable for consumption by household animals, such as dogs, cats and ferrets. However, those skilled in the art will appreciate that other animals, such as non-domesticated animals, may also benefit from the disclosed raw bone product.

Figure 1:
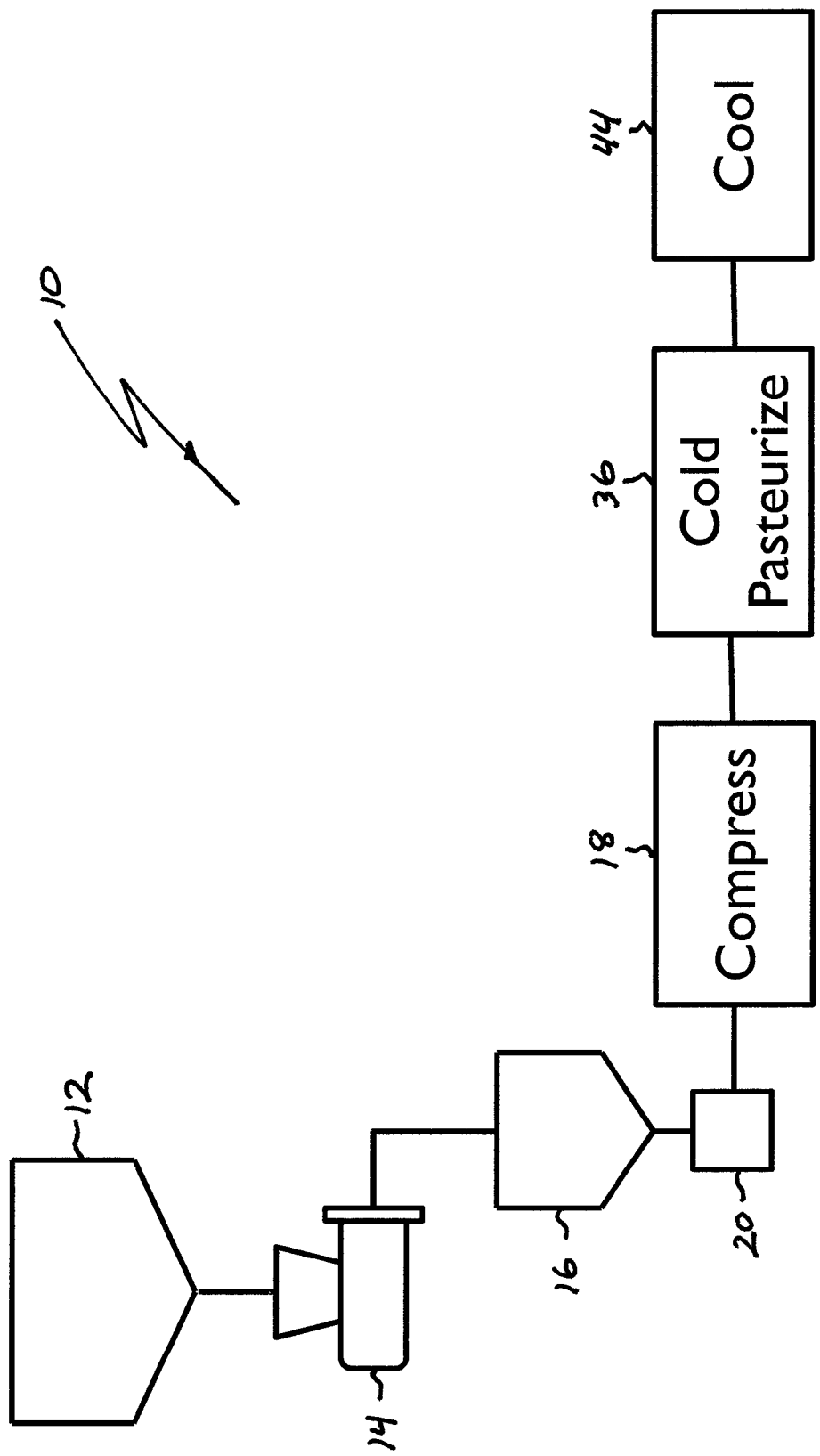
FIG. 1 is a schematic process flow diagram illustrating one embodiment of the disclosed method for manufacturing a high pressure processed raw bone product.

In one embodiment, the disclosed consumable raw bone product may be manufactured using the manufacturing method, generally designated 10, shown in FIG. 1. Other methods for manufacturing a frozen (or refrigerated), cold pasteurized, ground raw bone product are also contemplated.

The manufacturing method 10 may begin at a hopper 12 with a supply of raw bones. The type of raw bones used may be dictated by, among other things, the intended consumer of the resulting consumable raw bone product. Raw bones suitable for use with the disclosed manufacturing method 10 may include, but are not limited to, beef bones, lamb bones, venison bones (e.g., elk bones, moose bones or deer bones), pork bones, rabbit bones, chicken bones, turkey bones, duck bones and combinations thereof. As a non-limiting example, a combination of beef bones and lamb bones may be used to manufacture a consumable raw bone product intended for dogs.

As used herein, "raw bones" includes raw trimmed bones (i.e., bones with most meat removed therefrom) and raw meaty bones (i.e., bones with some meat attached thereto), as well as joints, cartilage, ligaments and tendons. Those skilled in the art will appreciate that joints, cartilage, ligaments and tendons may be intentionally incorporated into the supply of raw bones to increase the amount of nutrients, such as chondroitin, in the resulting consumable raw bone product.

In addition to raw bone, various optional components may be incorporated into the disclosed consumable raw bone product. The additional components may be added to the supply of raw bones in the hopper 12 as part of the feedstock, or may be added during other stages of the manufacturing method 10.

In a first optional implementation, one or more binders and/or hardening agents may be incorporated into the disclosed consumable raw bone product. For example, starch may be added to aid in binding the ground raw bone of the disclosed consumable raw bone product.

In a second optional implementation, a flavoring agent may be incorporated into the disclosed consumable raw bone product. Examples of suitable flavoring agents include cheese, vegetable extract, meat extract, fish extract and sugar.

In a third optional implementation, meat may be incorporated into the disclosed consumable raw bone product. For example, the supply of raw bone may be supplemented with meat, such as beef, lamb, venison (e.g., elk, moose or deer), pork, rabbit, chicken, turkey and/or duck.

In a fourth optional implementation, nutritional fortifiers may be incorporated into the disclosed consumable raw bone product. As one example, vitamins and/or supplements, such as fish oil, may be incorporated into the disclosed consumable raw bone product. As another example, biologics, such as digestive enzymes and/or probiotics, may be incorporated into the disclosed consumable raw bone product.

The feedstock of raw bones and optional additives may be transferred from the hopper 12 to a grinder 14. The grinder 14 may grind the feedstock to the desired size and may discharge the ground feedstock to a holding hopper 16.

The average particle size of the ground feedstock may be a process variable, and may be dictated by, among other things, consumer preference and veterinarian recommendations. For example, the grinder 14 may be configured to either coarsely or finely grind the feedstock. In one expression, the average particle size of the ground feedstock may fall within the range of about 0.2 millimeters to about 20 millimeters. In another expression, the average particle size of the ground feedstock may fall within the range of about 1 millimeter to about 10 millimeters. In yet another expression, the average particle size of the ground feedstock may fall within the range of about 3 millimeter to about 7 millimeters.

Optionally, the feedstock may be cooled during the grinding step to avoid cooking the raw bone material. One technique for cooling the feedstock during grinding may include introducing a cooling agent to the feedstock as the feedstock enters the grinder 14. Examples of suitable cooling agents include ice (water ice) and dry ice (frozen carbon dioxide).

The ground feedstock may be discharged from the holding hopper 16 to a compression unit 18. An optional metering device 20 may ensure that only the correct amount of ground feedstock is incrementally discharged to the compression unit 18. For example, when a consumable raw bone product having a final weight of 8 ounces is desired, the metering device 20 may incrementally discharge 8 ounces of the ground feedstock to the compression unit 18. Slightly more of the ground feedstock may be used if the ground feedstock includes components, such as cooling agents, that will dissipate during the manufacturing process.

Figure 2C:
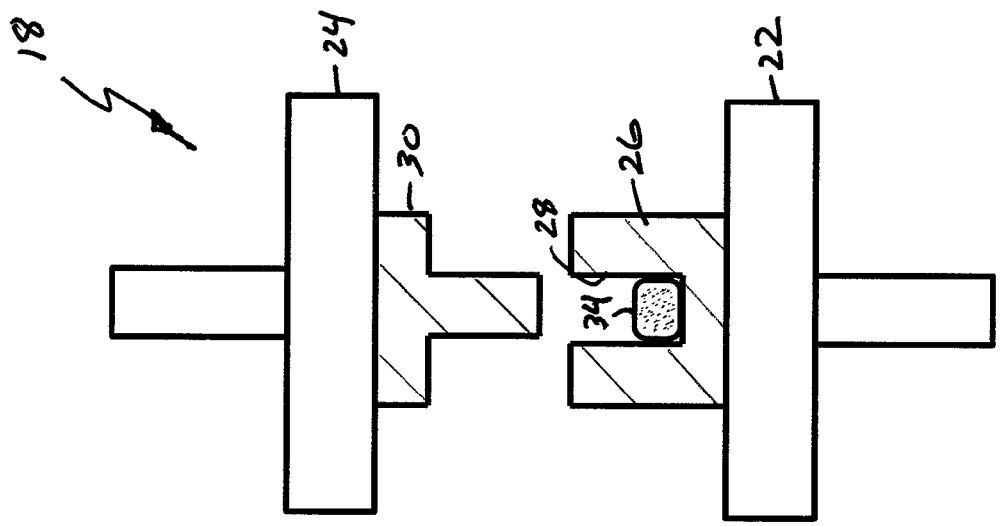
FIG. 2C is a side elevational view of the press of FIG. 2A shown after the pressing operation of FIG. 2B.
Figure 2B:
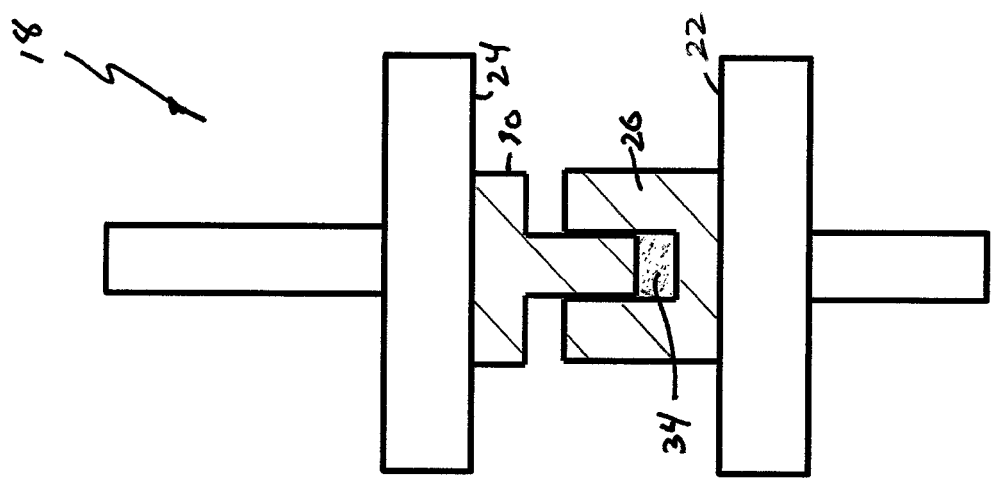
FIG. 2B is a side elevational view of the press of FIG. 2A shown during a pressing operation.
Figure 2A:
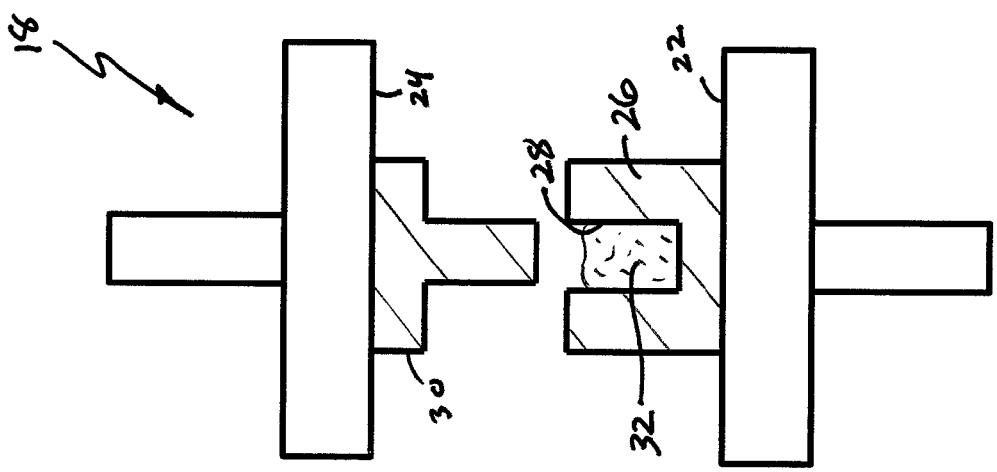
FIG. 2A is a side elevational view of a press for performing the compression step of the method of FIG. 1.

Referring to FIGS. 2A-2C, in one aspect, the compression unit 18 may be a press and may include a lower platen 22 and an upper platen 24. A female mold member 26 may be mounted on the lower platen 22, and may include a cavity 28 formed therein. A male mold member 30 may be mounted on the upper platen 24. Presses 18 with multiple pairs of mold members 26, 30 and/or multiple platens 22, 24 are also contemplated.

Alternatively, as shown in FIG. 2D, both mold members 26″, 30″ of the press 18″ may include a cavity 28″ formed therein.

Referring back to FIGS. 2A-2C, a metered amount of ground feedstock 32 may be discharged from the holding hopper 16 (FIG. 1) into the cavity 28 of the female mold member 26. Then, the upper platen 24 may be approximated toward the lower platen 22 to urge the male mold member 30 into engagement with the female mold member 26, thereby compressing the ground feedstock 32 into a rigid mass 34.

The pressure applied by the mold members 26, 30 to the ground feedstock 32 may be of a magnitude sufficient to bind together the particles of the ground feedstock 32 such that the rigid mass 34 maintains its shape (e.g., does not crumble) when removed from the cavity 28. Additionally, the pressure applied by the mold members 26, 30 to the ground feedstock 32 may be of a magnitude sufficient to minimize (if not eliminate) air pockets within the rigid mass 34. The effort in minimizing air pockets within the rigid mass 34 may be beneficial during the subsequent pasteurizing step.

While the rigid mass 34 is shown in the drawings as having a generally cylindrical shape, those skilled in the art will appreciate that the ground feedstock 32 may be compressed into various shapes, and that the ultimate shape of the rigid mass 34 will be dictated by the shapes of the mold members 26, 30. For example, the ground feedstock 32 may be compressed into a rigid mass 34 having a bone shape.

Figure 3:
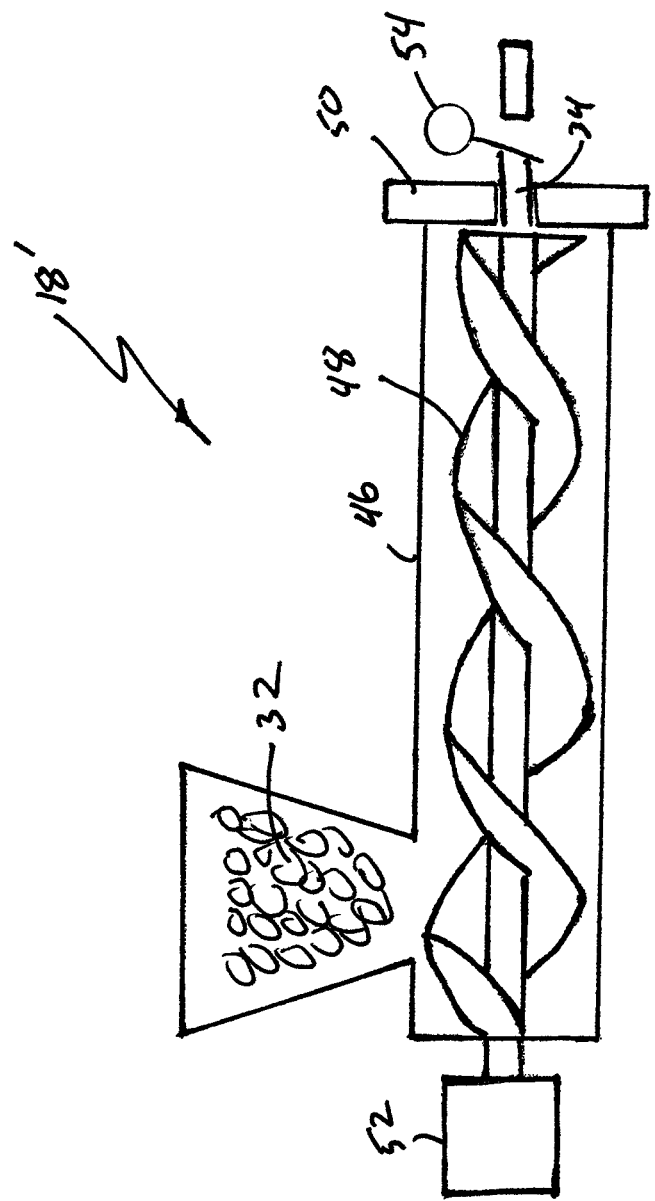
FIG. 3 is a side elevational view of an extruder for performing the compression step of the method of FIG. 1.

Referring to FIG. 3, in another aspect, the compression unit 18′ may be an extruder, and may include a housing 46, an auger 48, a die 50 and motor 52. The motor 52 may rotate the auger 48 about its longitudinal axis to urge the ground feedstock 32 forward through the housing 46 and, ultimately, through the die 50.

In one construction, the extruder 18′ may be a single stage extruder. In another construction, the extruder 18′ may be a multi-stage extruder, either with or without a vacuum chamber between stages. Furthermore, the extruder 18′ may be jacketed to receive a cooling (or heating) fluid.

As the ground feedstock 32 is urged through the die 50, the ground feedstock 32 may be compressed into a continuous rigid mass 34. A cutting element 54 may cut the continuous rigid mass 34 into individual pieces having the desired size.

Referring back to FIG. 1, the rigid mass 34 formed at the compression unit 18 may be transferred to a pasteurization unit 36 where it may be pasteurized without experiencing a significant temperature increase. Therefore, the pasteurization unit 36 may be a "cold" pasteurization unit, wherein microbes and the like are inactivated without exceeding temperatures of 100° F. As one specific example, the pasteurization unit 36 may be a high pressure pasteurization unit.

Figure 4:
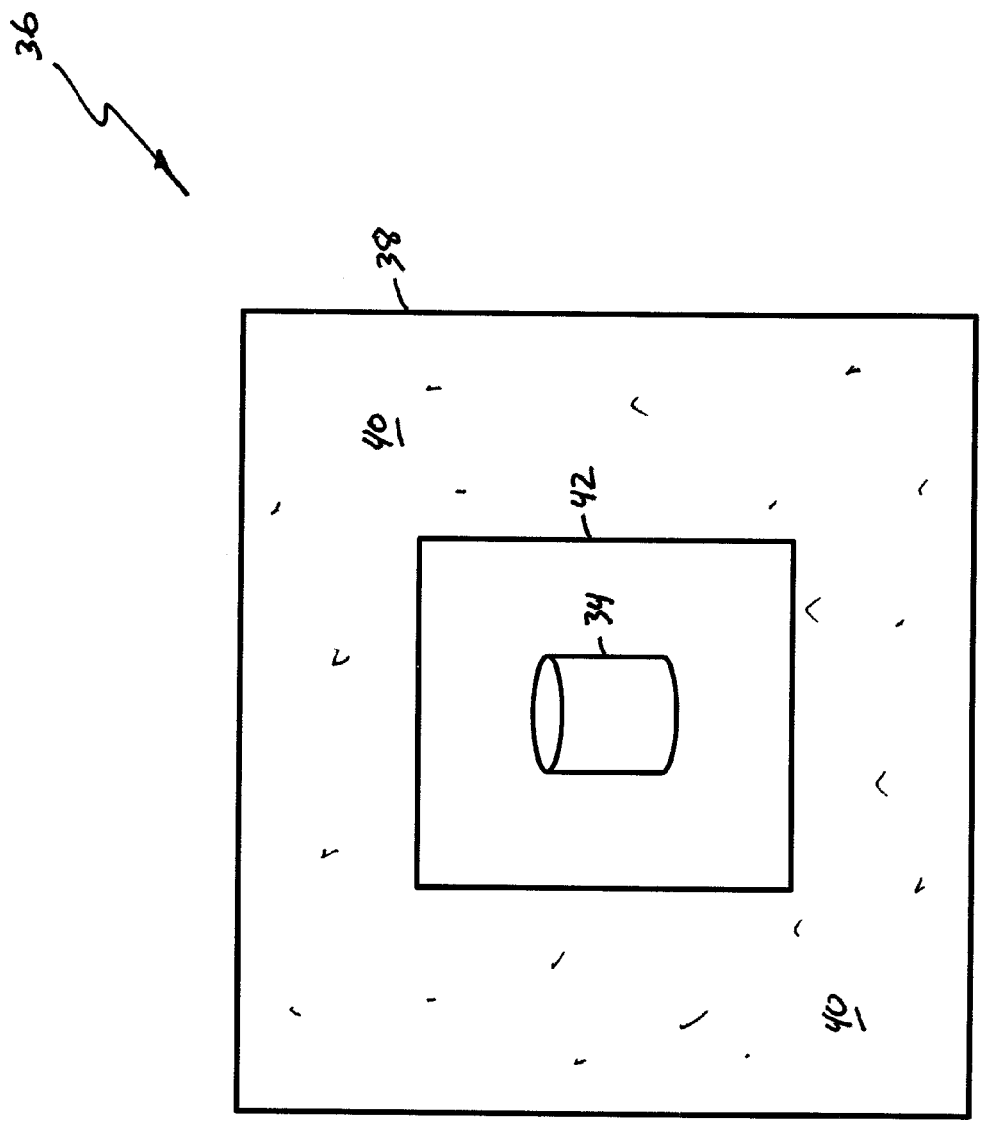
FIG. 4 is a schematic view of a high pressure processing assembly for performing the cold pasteurization step of the method of FIG. 1.

As shown in FIG. 4, a high pressure pasteurization unit 36 may include a pressure vessel 38 having a pressure chamber that may be filled with a hydraulic fluid 40. To achieve cold pasteurization, the rigid mass 34 may be submerged in the hydraulic fluid 40 in the pressure vessel 38. Optionally, to avoid direct contact between the rigid mass 34 and the hydraulic fluid, the rigid mass 34 may be placed in a flexible container 42 (e.g., a pouch or bottle) before being submerged in the hydraulic fluid 40. Then, the pressure of the hydraulic fluid 40 may be increased such that high pressure is hydrostatically applied to the rigid mass 34 for a predetermined amount of time.

The magnitude of the pressure applied to the rigid mass 34 and the time that the high pressure is applied to the rigid mass 34 are controllable variables. Therefore, both the magnitude of the pressure and the total pressurization time may be optimized to achieve the desired level of pasteurization.

In one particular embodiment, the pressure applied to the rigid mass 34 in the pasteurization unit 36 may be in the range of about 4000 atm to about 6000 atm, and the pressurization time may range from about 3 minutes to about 5 minutes. Those skilled in the art will appreciate that pressurization times may be reduced when higher pressures are used.

The pasteurization step 36 may be performed at ambient temperatures. However, due to the temperature increase that typically accompanies an increase in pressure, a cooling unit, such as a cooling jacket applied to the pressure vessel 38, may be employed to minimize or eliminate any unintentional cooking of the rigid mass 34 during the pasteurization step 34.

The compression step 18 (pressing or extruding) has been described above as occurring before the cold pasteurization step 36. However, in an alternative embodiment, the ground feedstock 32 may be subjected to the cold pasteurization step 36 prior to the compression step 18.

The pasteurized rigid mass 34 may be subjected to a cooling step 44. In a first realization, the cooling step 44 may lower the temperature of the pasteurized rigid mass 34 to a refrigeration temperature. The refrigeration temperature may be in the range of about 32° F. to about 40° F. In a second realization, the cooling step 44 may lower the temperature of the pasteurized rigid mass 34 to a frozen temperature. The frozen temperature may be below about 32° F.

At this point, those skilled in the art will appreciate that steps may be taken to ensure that the cooled, pasteurized rigid mass is not subjected to temperature abuse. Specifically, steps may be taken to ensure that the cooled, pasteurized rigid mass does not experience a temperature increase above the refrigeration temperature (or frozen temperature for frozen products) from the time it leaves the cooling unit 44 to the time it is sold to a consumer.

Accordingly, the disclosed method 10 may be used to manufacture the disclosed cold pasteurized, ground raw bone product. The disclosed cold pasteurized, ground raw bone product may be generally rigid, and may include either pure or modified (e.g., flavored) ground bone.

Although various aspects of the disclosed raw bone product and method have been shown and described, modifications may occur to those skilled in the art upon reading the specification. The present application includes such modifications and is limited only by the scope of the claims.

What is claimed is:

1. A method for manufacturing a raw bone product comprising the steps of:
   providing a raw bone;
   grinding said raw bone into ground raw bone;
   compressing said ground raw bone into a rigid mass;
   cold pasteurizing said rigid mass at a temperature of at most 40° F. and a pressure of at least about 4000 atm; and
   maintaining said rigid mass in a raw state.

2. The method of claim 1 wherein said compression step is performed prior to said cold pasteurizing step.

3. The method of claim 1 wherein said raw bone comprises at least one of a beef bone, a lamb bone, a venison bone, a pork bone, a rabbit bone, a chicken bone, a turkey bone and a duck bone.

4. The method of claim 1 further comprising the step of introducing at least one of a binder, a flavoring agent, a meat and a nutritional fortifier to said ground raw bone.

5. The method of claim 1 wherein said grinding step is performed such that said ground raw bone has an average particle size of at most 20 millimeters.

6. The method of claim 1 wherein said compression step comprises the step of extruding said ground raw bone.

7. The method of claim 1 wherein said compressing step comprises the steps of:
   (a) providing a male mold member and a female mold member, said female mold member having a cavity formed therein;
   (b) placing a predetermined quantity of said ground raw bone into said cavity; and
   (c) approximating said male mold member with said female mold member.

8. The method of claim 1 wherein said cold pasteurizing step is performed in a high pressure pasteurization vessel.

* * * * *